Oct. 20, 1964 H. S. SCHWARTZ 3,153,776

SEQUENTIAL BUFFER STORAGE SYSTEM FOR DIGITAL INFORMATION

Filed May 26, 1961 3 Sheets-Sheet 1

INVENTOR.
HAROLD S. SCHWARTZ
BY Alfred W. Barber
ATTORNEY

Oct. 20, 1964 H. S. SCHWARTZ 3,153,776
SEQUENTIAL BUFFER STORAGE SYSTEM FOR DIGITAL INFORMATION
Filed May 26, 1961 3 Sheets-Sheet 2

INVENTOR.
HAROLD S. SCHWARTZ
BY
Alfred W. Barber
ATTORNEY

SEQUENTIAL BUFFER STORAGE SYSTEM FOR DIGITAL INFORMATION

Filed May 26, 1961 3 Sheets-Sheet 3

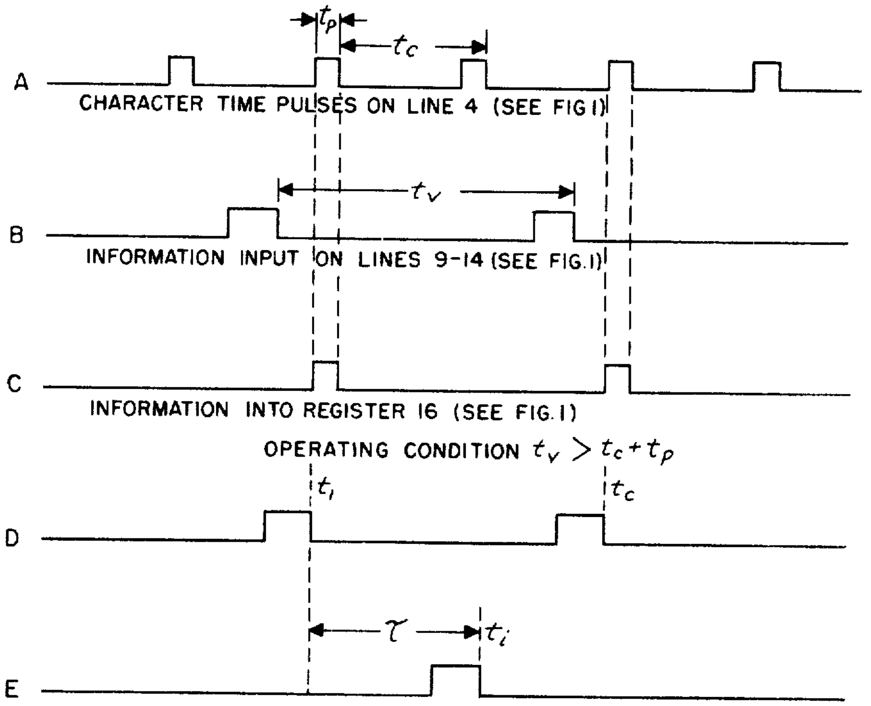

$t_i$ = INPUT TIME ON LINE 22 (SEE FIG. I)
$t_0$ = FIRST TIME ADDRESS FOR INFORMATION OCCURRING AT TIME $t_i$ IS ACCESSIBLE
$t_1$ = SECOND TIME $t_i$ IS ACCESSIBLE
HENCE $\tau = t_i - t_1$ = TIME INFORMATION MUST BE DELAYED TO ARRIVE AT MAIN DELAY LINE 48-49-75-72 AT TIME $t_1$

FIG. 3

INVENTOR.
HAROLD S. SCHWARTZ
BY
Alfred W. Barber
ATTORNEY 3,153,776

SEQUENTIAL BUFFER STORAGE SYSTEM FOR DIGITAL INFORMATION

Harold S. Schwartz, White Plains, N.Y., assignor to Potter Instrument Company, Inc., Plainview, N.Y., a corporation of New York Filed May 26, 1961, Ser. No. 113,009
6 Claims. (Cl. 340—172.5)

The present invention concerns buffer storage systems for receiving, assembling, storing and feeding out digital information. In particular, it concerns systems capable of utilizing continuously variable or asynchronous input and output rates and such systems utilizing delay lines as storage devices.

In digital information and data handling systems, various devices are used for storing such information for varying periods of time and in various parts of the system. Where very large amounts of information are stored for long periods of time, recordings on magnetic tape are most commonly used. Where very small amounts of information are stored for short periods of time, vacuum tube or transistor flip-flop circuits are commonly used. There are also many requirements for intermediate types of storage where a few hundred to several thousand bits must be stored for a short but finite length of time. This type of storage, for example, is required to assemble digital information received at random or irregular rates to provide blocks of characters in bit form at regular and precisely predetermined rates. Such a device commonly called a buffer storage is required to provide synchronous digital signals to a printer from asynchronously received data bits.

The present invention concerns a method of utilizing delay lines in a buffer storage capable of operation with continuously variable or asynchronous input and output data bit rates. These delay lines may utilize almost any continuously circulating storage device such as a magnetic drum, mercury quartz, magnetostrictitive or other delay line or the like. While such devices have been utilized as delay devices, their use has been confined to blocks of synchronously available digital information to be fed in or fed out of the device in a continuous stream. According to the present invention, these storage devices may be filled in many steps, a procedure not ordinarily associated with continuously circulating devices. The novel results are obtained by a combination of counting and delaying devices permitting small blocks of digital information to be loaded into a continuously circulating storage device already partly filled.

Briefly, information is received in a register capable of holding one character, or seven bits for example, in either series or parallel form. A stable clock oscillator is provided for timing all steps in the process to be outlined below. A counter is provided which gives an output for each count of 7, or other predetermined number of bits in a character, to provide a control signal each time the clock count equals this predetermined number. Each time the character bit count is reached, as signalled by this first counter, the contents of the first register is emptied in parallel to a second shift register of the same capacity. Information may be accepted by the first register at any time and at any rate slower than the character time set up, except during emptying into the second register. The information thus held in the second register is ready for placing in the main storage.

The main storage consists in a delay line or other device in which information representing signal bits continually circulate. The data to be stored is timed into this storage device so that it finally is filled with data circulating in its proper sequential order. The present invention concerns, particularly, the method by which the data is accumulated in the delay line from blocks of data such as characters and eventuates in a line full of data in its proper sequence. A second counter counts characters and gives an indication once each time a count is reached equal to the capacity of the delay line. Before any data is stored in the line, this second counter indicates once for each circulation time of the delay line which should also be equal to the time required to reproduce enough characters to fill this line under control of the clock. Thus, there is correspondence between the circulation time of the line and the time occupied by the data to be stored in the line. Any tendency for the two to get out of step will be corrected by gating the recirculation of the line contents under control of the clock acting through the second counter. Now assume a character to be stored is available in the second shift register. The second counter at the instant it fills is used to gate the first character into the line. We may call this the first stored character and the time it is fed into the line may be designated as zero time. The second counter is now set back one character count so that its zero time coincides with the trailing end of the first character in the main storage.

At some later time a second character appears in the second shift register. If it had appeared immediately after the first character, it could have been fed directly into the line to follow the first character in sequence. However, assuming the second character is too late to feed into the storage line immediately, the count in the second counter at the instant the second character appears will indicate how many character periods have elapsed since the ending of the first stored character. The complement of this count will be the number of character periods which will elapse before the end of the first stored character comes around the circuit again. Hence, this second character is gated into an auxiliary delay line or series of lines taken in combination having a time delay equal to time of these character periods so that when it emerges, it will be timed to flow into the main delay line right behind the first stored character i.e. at the next available address. The second clock is set back another character as it is each time a character is stored in the main delay line storage so that it always indicates the end point of the stored characters. The auxiliary delay lines are made up of segments or is tapped in such a way as to present access for any character period increment from one up to one less than the full capacity of the main delay line.

When the storage of the complete data up to the capacity of the main storage delay line has been completed, the information thus accumulated is fed out. Initially the first 36 characters are returned to a second variable delay line where they pass from one line or one line section to the next in succession. Upon filling the variable delay line, the information is repeated from the circulation in the main delay line. Thus information is available for read out 6 character times after filling the main line and continues to be available continually until utilized. The various address counters serve to pace the characters through the various delay lines until called for as output.

Thus the main object of the present invention is to provide a method of and means for receiving, assembling, storing and feeding out on demand a predetermined amount of digital information.

Another object is to provide a flexible buffer storage device capable of utilizing series or parallel digital information.

Still another object is to provide a buffer storage of intermediate capacity which is economical for its particular range of capacity.

A further object is to provide an intermediate capacity storage capable of functioning at very high speed.

A still further object is to utilize delay lines such as magnetostrictive or other types of electric storage in a flexible buffer storage capable of continuously variable or asynchronous input and output operation.

These and other objects will be apparent from the detailed description of the invention given in connection with the various figures of the drawing.

In the drawing:

FIGURE 3 is a series of timing diagrams useful in illustrating the mode of operation of the invention.

Figure 1:
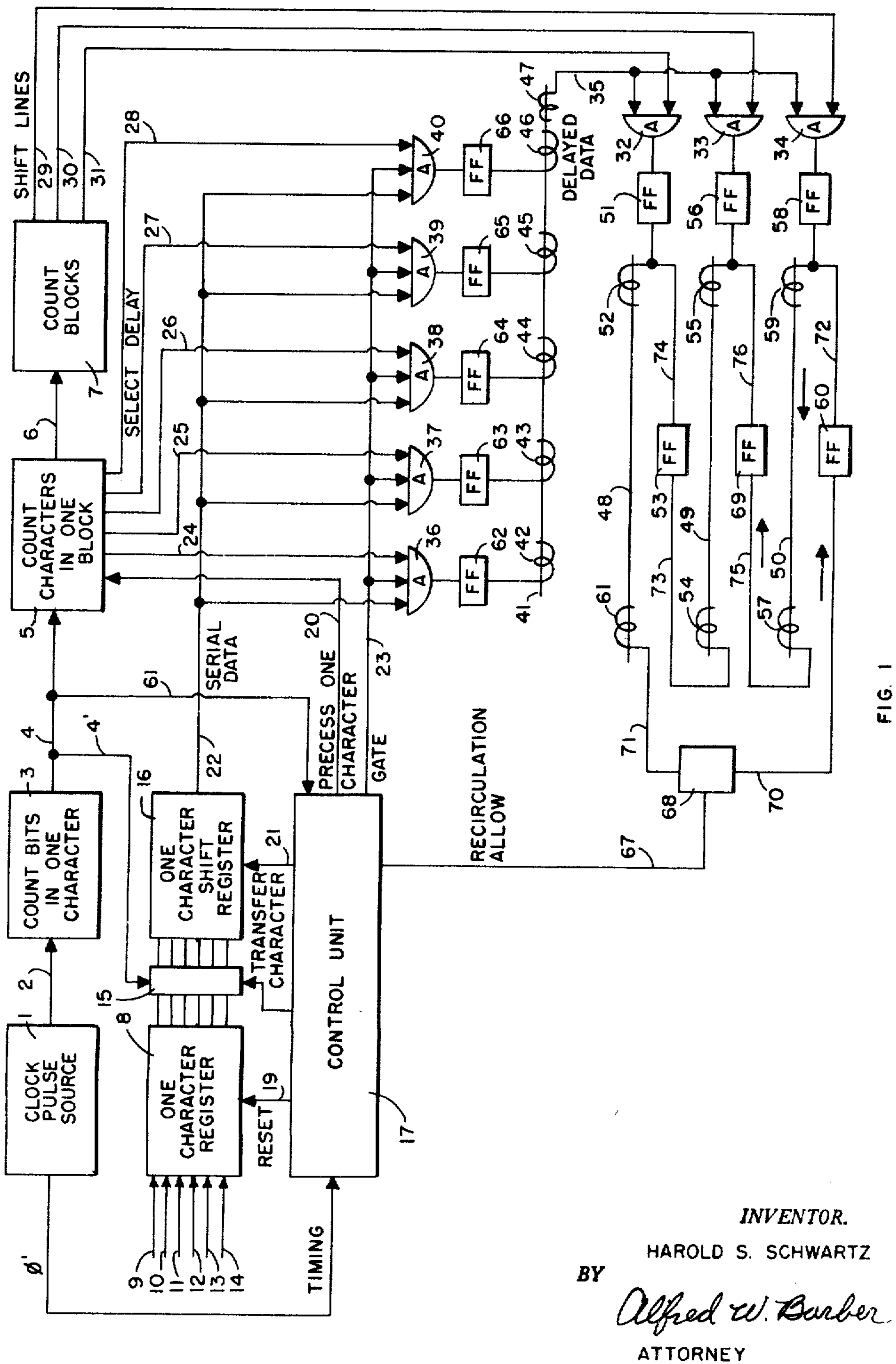
FIGURE 1 is a block diagram of the preferred form of the present invention illustrating the storage part of the operating cycle.

FIG. 1 is a block diagram of a system in accordance with the present invention including those components which are used between an input point and the main delay line storage. The basic timing for the process are provided by a source of clock pulses 1 which may include a stable frequency source such as a quartz crystal oscillator the output of which is converted to equally spaced timing pulses in any suitable manner as is well known in the art. Clock pulses from source 1 are applied to a counter 3 over line 2. This counter 3 is a counter which provides an output pulse each time a predetermined count is reached and automatically starts counting again. The predetermined count of counter 3 is the number of bits in each character of the digital information being handled, for example, a count of six. The output pulses from counter 3 which occur once for each character are applied to character counter 5 over line 4. Counter 5 may be a predetermined counter set to provide an output pulse once each time a count is reached representing the number of characters in a block. This number may be selected for convenience of operation as will be set forth in more detail below. The output pulses from character 1 block counter 5 are fed to predetermined block counter 7 over line 6. Counter 5 is set to provide output pulses for each block counted and to fill when the number of blocks counted times the number of characters in a block equals the total number of characters which the system is designed to handle. Counters 5 and 7 provide other output pulses as will be set froth below along with the purposes fulfilled. Clock pulses from source 1 are also supplied to control unit 17 over line 18.

Now, going to the digital information input circuits, the single character register 8 receives digital information signals over one or more of input lines 9, 10, 11, 12, 13 and 14. Register 8 is adapted to receive characters consisting of simultaneous parallel bits over a number of lines equal to the number of bits per character or serial bits over a single line and to provide a parallel output in either case. Register 8 is designed to receive information in parallel and feed out one character for each cycle of its operation. Resetting of register 8 is supplied from control unit 17 over line 19. Each time a character has been completely received in register 8, it is transferred through gate 15 under control of character time pulses over line 4' to the one character shift register 16 which is capable of sending out the serial data constituting each character over line 22 in response to transfer command signal from control unit 17 applied over line 21. This output serial data is made available at the first inputs to AND gates 36, 37, 38, 39 and 40 for utilization as will be set forth below. The character counter 5 provides successive output pulses on lines 24, 25, 26, 27 and 28 as successive character times are counted so that the second of the enabling inputs to AND gates 36 through 40 are energized one at a time. The third enable signal to these AND gates is supplied from control unit 17 over line 23. When three enable signals occur simultaneously, at a given AND gate the serial data is fed to the corresponding one of flip-flop 62, 63, 64, 65 or 66. These flip-flops, when excited, will in turn impress the information bearing data signals on delay line 41 over one of the corresponding coupling 42, 43, 44, 45 or 46. Any signals thereby delayed in delay line 41 arrive after appropriate delays at output coupling 47 and are applied to AND gates 32, 33 and 34 over line 35. The second enable signals for these gates is applied from counter 7 over lines 31, 30 and 29 respectively carrying signals which are shifted from one line to the next for each elapsed interval of time equal to the elapsed time for one block of characters. When information signals flow from delay line 41, they are directed to their proper place in the total signal sequence by these signals. The coincidence of an enabling signal from one of line 31, 30 or 29 and information signals properly delayed from line 41 opens the corresponding gate and the signals flowing therethrough actuates one of corresponding flip-flop 51, 56 or 58 and in turn impresses signals on one of delay lines 48, 49 and 50 through one of coupling 52, 55 or 59. Couplings between these delay lines is provided by pick-ups 57, and 54 through their associated flip-flops and input couplings 55 and 53. Recirculation of the stored information may be accomplished from pick-up 61 to input coupling 59 over line 60 with its associated flip-flop in the presence of a recirculation allow signal over line 62 from control unit 17 to control 63.

Figure 2:
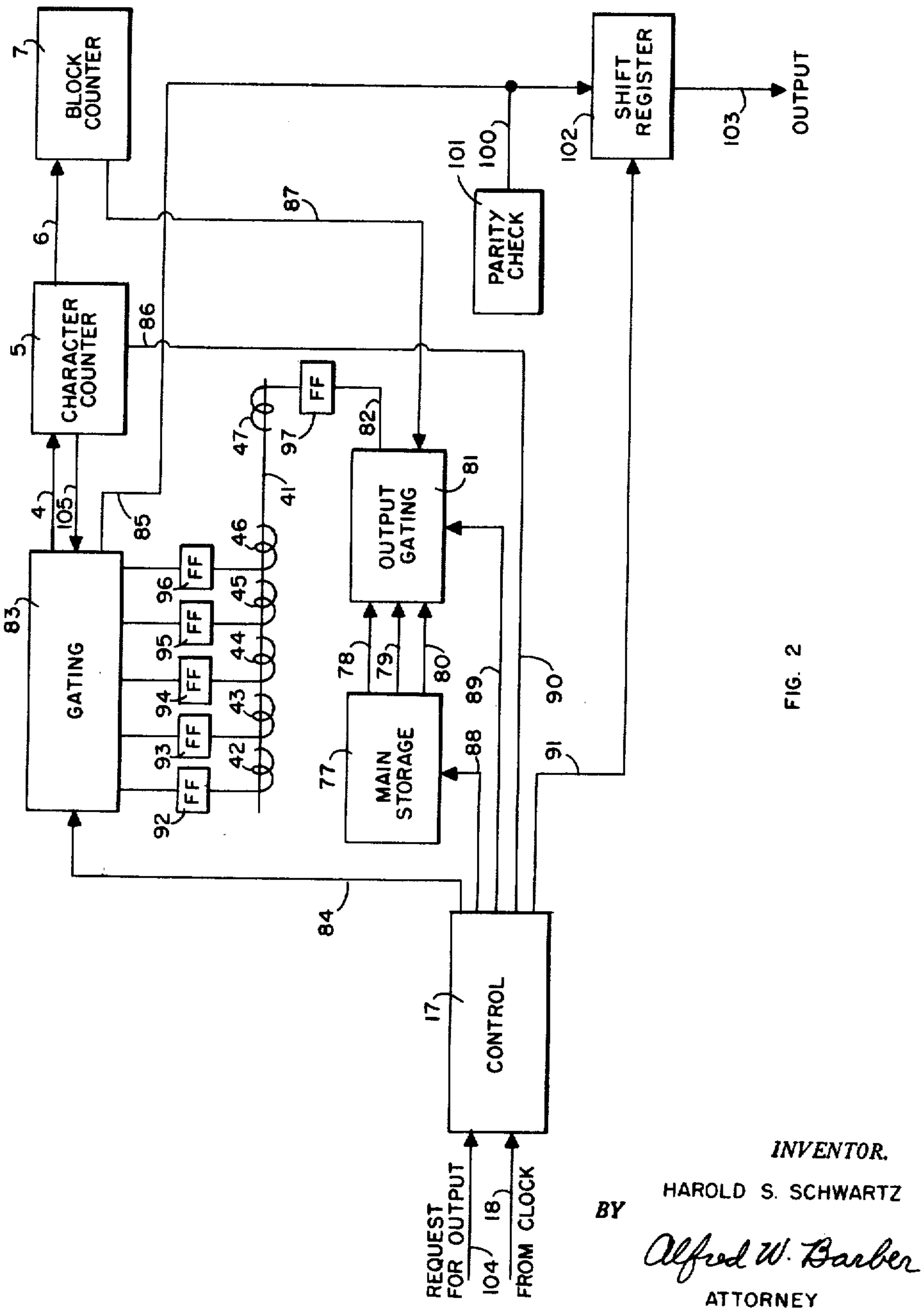
FIGURE 2 is a block diagram of the preferred form of the present invention illustrating the feed-out part of the operating cycle.

FIG. 2 shows the additional blocks used in recovering information from storage as well as the blocks bearing the same designations as in FIG. 1 which are involved in the feed out process. As soon as the storage of information in the main storage 77 (shown as lines 48, 49 and 50 in FIG. 1) has been completely stored it becomes available as output. This stored information as described above, has been placed in the main delay line storage and is circulating. In the example being described it is assumed that the complete information being handled consists in three blocks of information. The lines 78, 79 and 80 to output gate 81 represent three time displaced output points from storage, one for each block. Thus, of the first block appears at line 78, the second appears simultaneously at line 79 and the third at line 80. Timing from block counter 7 over line 87 opens these lines in sequence so that the first block of information first flows out over line 78 to line 82 to variable delay line input coupling 47 through driver flip-flop 97. If the information is not utilized by passing it on to the output 103 and out of the system, it is repeated from line 79 and in turn from line 80 until utilized. Thus, the first block of information passes out of storage 77, through gate 81 to delay line 41 where its beginning character appears successively at couplings 46, 45, 44, 43 and 42 and through their associated repeater flip-flops 96, 95, 94, 93 and 92 respectively and is tracked by counter 5. If at any time read-out is called for by a request for output over circuit 104, control 17 sends a gating pulse over line 84 to gate 83 opening it at which ever of flip-flops 92–96 is indicated by tracking pulses over line 105 and output flows over line 85 to junction 99 where it is checked for parity and fed to shift register 102 and then under control of pulses over line 91 is fed to output circuit 103. Thus it will be seen that as soon as storage 77 has been filled that the information is returned through lines 78, 79, 80, 82, and along gate 83 in such a manner that once it has reached gate 83, the first character is always available at some point in gate 83 ready to start the flow of the complete information to the output. Actually the information keeps recirculating in storage 77 while it is simultaneously made available at gate 83.

To repeat briefly, random occurrence information characters are received and by predetermined delays directed to their proper addresses in a circulating storage where they circulate, while continuously available for output on request.

FIG. 3 will serve to clarify several of the more important timing relations met in the information receiving and storing process. The pulses along line A represent the character time pulses to be found on circuit 4 of FIG. 1. These pulses occur regularly as counter 3 counts repeatedly the number of pulses in one character say seven. Each time one of these pulses occurs information contained in register 8 may be placed in register 16 by opening gate 15. Information characters may not be received more frequently than these pulses occur as shown in line B where *tv* is the time between information character occurrence and must be greater than *tc* plus *tp* where *tc* (line A) is the time between character pulses and *tp* is the duration of the character pulse. The information is gated into register 16 during the character time pulses as indicated on line C. Although the information may be received in register 8 at any rate and at any time except during the interval of feed-out to register 16, the feeding out of information from register 8 to register 16 is carried in an interval of time not greater than *tp*.

Another point at which timing is very important is where the information characters are placed in storage in the main delay lines. Since the information in the delay lines is circulating, new characters must be entered at their proper address. For example, FIG. 3 in line D shows an address at its first occurrence but the information to be stored occurring at $t_1$ in line E has not occurred and hence cannot be stored. However the information at $t_1$ occurs before the time of occurrence of its address for the second time at $t_1$ and hence the information is delayed by the difference $t_1—t_1$ in the auxiliary delay lines as set forth above and will then be properly timed to be fed into the main delay line at its proper address.

The term "address" as used in connection with the present invention may be taken to mean the location in time or space of a bit character or block of digital information or it may designate the digital coded representation of that location.

While only one embodiment of the present invention has been shown and described, many modifications will be apparent to those skilled in the art and within the spirit and scope of the invention as set forth in particular in the appended claims.

What is claimed is:

1. In a digital information buffer storage system, the combination of, a first information storage means, means for receiving random time of occurrence digital information characters, means for establishing addresses for said characters in said storage, a second information storage means for receiving information in parallel and feeding it out serially in a predetermined manner, means for connecting said characters to predetermined portions of said second information storage means to delay said characters as a function of the time relationship between the time of existence of said characters in said predetermined manner and said addresses, and means for connecting the output from said second information storage means to said first information storage means.

2. A digital information storage system as set forth in claim 1 wherein said first storage information means includes a magneto-strictive delay line having recirculating means.

3. A digital information storage system as set forth in claim 1 wherein said second information storage means includes a magneto-strictive delay line having a plurality of equally spaced tap points.

4. A digital information storage system as set forth in claim 1 wherein said receiving means includes a single character register.

5. A digital information storage system as set forth in claim 1 wherein said receiving means includes parallel input means.

6. A digital information storage system as set forth in claim 1 wherein said receiving means includes serial input means.

References Cited in the file of this patent

UNITED STATES PATENTS

| | | |
|---|---|---|
| 2,495,740 | Labin | Jan. 31, 1950 |
| 2,914,757 | Millership | Nov. 24, 1959 |
| 2,961,535 | Lanning | Nov. 26, 1960 |
| 2,978,680 | Schulte | Apr. 4, 1961 |